US007990618B2

(12) United States Patent
Miyaki et al.

(10) Patent No.: US 7,990,618 B2
(45) Date of Patent: Aug. 2, 2011

(54) LIGHT-DIFFUSING FILM AND SCREEN INCLUDING THE SAME

(75) Inventors: Yukio Miyaki, Kanagawa (JP); Hiroyuki Kiso, Miyagi (JP); Tsutomu Nagahama, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/211,897

(22) Filed: Aug. 25, 2005

(65) Prior Publication Data

US 2006/0050188 A1 Mar. 9, 2006

(30) Foreign Application Priority Data

Sep. 1, 2004 (JP) ................. P2004-254328

(51) Int. Cl.
*G02B 5/02* (2006.01)
(52) U.S. Cl. ...................................... 359/599
(58) Field of Classification Search .................... 359/599
See application file for complete search history.

(56) References Cited

U.S. PATENT DOCUMENTS

| 4,427,265 | A * | 1/1984 | Suzuki et al. ................. 359/599 |
| 5,189,454 | A * | 2/1993 | Yamazaki et al. ............ 396/150 |
| 6,724,535 | B1 * | 4/2004 | Clabburn ...................... 359/619 |
| 2001/0053029 | A1 * | 12/2001 | Umemoto et al. ............ 359/599 |
| 2002/0098776 | A1 | 7/2002 | Dopper |
| 2003/0081311 | A1 | 5/2003 | Doi |
| 2004/0066548 | A1 | 4/2004 | Boerner et al. |
| 2004/0100699 | A1 * | 5/2004 | Cowan et al. ................. 359/599 |
| 2004/0179269 | A1 * | 9/2004 | Kathman et al. ............. 359/599 |
| 2005/0007663 | A1 * | 1/2005 | Chubachi et al. ............ 359/449 |
| 2005/0234193 | A1 | 10/2005 | Sasagawa et al. |

FOREIGN PATENT DOCUMENTS

| EP | 1 564 587 | 8/2005 |
| JP | 53-51755 | 5/1978 |
| JP | 63-186224 | 8/1988 |
| JP | 01-298302 | 12/1989 |
| JP | 05-100106 | 4/1993 |
| JP | 2000-275410 | 10/2000 |
| JP | 2000-280267 | 10/2000 |
| JP | 2000-284106 | 10/2000 |
| JP | 2000284106 | 10/2000 |
| JP | 2001-100621 | 4/2001 |
| JP | 2003084101 | 3/2003 |
| JP | 2003-147209 | 5/2003 |
| JP | 2003-177221 | 6/2003 |
| JP | 2003-313445 | 11/2003 |
| JP | 2004-131520 | 4/2004 |
| WO | WO 02/37568 | 5/2002 |
| WO | WO 2004/003027 | 1/2004 |

* cited by examiner

*Primary Examiner* — Joshua L Pritchett
(74) *Attorney, Agent, or Firm* — K&L Gates LLP

(57) ABSTRACT

A light-diffusing film and screen including same are provided. The light-diffusing film having anisotropy in the diffusion angle includes a translucent support, and a translucent resin layer having irregularities on the surface thereof and being provided on the translucent support. In the light-diffusing film, the maximal value of the loss tangent (tan δ) determined from a dynamic viscoelasticity of the light-diffusing film lies in a temperature range of 0° C. to 60° C.

5 Claims, 3 Drawing Sheets

LIGHT-DIFFUSING FILM AND SCREEN INCLUDING THE SAME

CROSS REFERENCE TO RELATED APPLICATIONS

The present application claims priority to Japanese Patent Application No. 2004-254328 filed in the Japan Patent Office on Sep. 1, 2004, the entire contents of which being incorporated herein by reference.

BACKGROUND

The present invention relates to a light-diffusing film used in a screen for a front projector, a screen for a rear projector, or a backlight for a liquid crystal display, and a screen including the light-diffusing film.

Recently, overhead projectors and slide projectors have been widely used when a speaker presents a document in a conference or the like. Video projectors and motion picture film projectors using liquid crystal have also been widely used in households. In these projectors, light output from a light source is subjected to an optical modulation with a transmissive liquid crystal panel or the like to form image light. This image light is emitted through an optical system such as a lens and projected on a screen.

In the above-described projector units, a screen for a projector is used to view a projected image. This screen for a projector is broadly divided into a screen for a front projector and a screen for a rear projector. In the front projector, a light source emits projection light from the front side of a screen, and the projection light reflected on the screen is viewed. In the rear projector, a light source emits projection light from the back-side of a screen, and the light transmitted through the screen is viewed from the front side of the screen. Both screens used in the above methods preferably have a satisfactory visibility and a wide viewing angle.

For this purpose, a light-diffusing film for scattering light on the surface of a screen is generally provided in both methods. This light-diffusing film allows image light to be emitted by diffusing uniformly on the entire effective area of a screen.

Known light-diffusing films are broadly divided into an isotropic diffusion sheet and an anisotropic diffusion sheet. Since the amount of incident light is the same in these two sheets, the anisotropic diffusion sheet, which can improve the luminance by diffusing light only in the desired direction, has drawn attention. In particular, when a light-diffusing film is used in a projection screen, the field of view in the horizontal direction is more important than that in the vertical direction. Therefore, an anisotropic diffusion sheet having a strong diffusing capacity in the horizontal direction has been developed.

Known methods for making such an anisotropic light-diffusing film includes a method of forming a speckle pattern on a photosensitive resin, the speckle pattern being formed by irradiating a coherent beam of light on a rough surface (see, for example, Japanese Unexamined Patent Application Publication Nos. 53-51755 and 2001-100621); a method of exposing such a pattern on a photosensitive resin using a mask; and a method of directly cutting the surface of a mold base material such as a metal or a resin by machining to prepare a mold having fine irregularities thereon, and transferring the shape of the irregularities from the mold using a UV curable resin or the like (see, for example, Japanese Unexamined Patent Application Publication No. 2000-284106).

In addition, a method of applying a mixture of a resin binder and resin beads dispersed in the resin binder on a transparent substrate is known.

However, scratches are easily formed on the surface of a known anisotropic light-diffusing film. As a result, a light-diffusing capacity is lost, thus causing image defects. In a method of making an anisotropic light-diffusing film including a mixture of a resin binder and resin beads dispersed therein, the scratch resistance can be improved using soft beads (see, for example, Japanese Unexamined Patent Application Publication No. 2000-275410). However, because of scratches, the beads are detached even by this method. Furthermore, in this case, although beads having an anisotropic shape are used in the coating in order to provide anisotropy, the orientation of the beads is insufficient and a satisfactory light-diffusing anisotropy is difficult to be achieved.

In addition, the surface of the anisotropic light-diffusing film is damaged during storing or handling, thus causing image defects.

In the method of making an anisotropic light-diffusing film including transferring an irregular shape on the surface of a mold, a resin is damaged when the resin is released from the mold after curing. This damage may cause image defects.

SUMMARY

In view of the above-mentioned problems in the related art, it is desirable to provide a light-diffusing film having anisotropy in the light-diffusing property between the vertical direction and the horizontal direction and having an excellent scratch resistance, and the surface of which is not damaged even when the film is released from a mold and even during storing and handling of the film. Also, it is desirable to provide a screen including the light-diffusing film.

According to an embodiment of the present invention, there is provided a light-diffusing film having anisotropy in the diffusion angle, the light-diffusing film including a translucent support and a translucent resin layer having irregularities on the surface thereof and being provided on the translucent support, wherein the maximal value of the loss tangent (tan δ) determined from a dynamic viscoelasticity of the light-diffusing film lies in a temperature range of 0° C. to 60° C.

The irregularities on the translucent resin layer are preferably formed by transferring an irregular shape on the surface of a mold. Furthermore, the irregular shape on the surface of the mold is preferably formed by sandblasting so that all angles of spraying of abrasives are less than 90 degrees.

According to an embodiment of the present invention, there is provided a screen including a light-diffusing film according to an embodiment of the present invention, and a reflective layer provided on a surface of the light-diffusing film, the surface being opposite to another surface having a translucent resin layer.

According to an embodiment of the present invention, there is provided a screen including a light-diffusing film according to an embodiment of the present invention, wherein the light-diffusing film transmits light incident from a surface opposite to another surface having a translucent resin layer, and diffuses and emits the light from the translucent resin layer.

A light-diffusing film according to an embodiment of the present invention has anisotropy in the light-diffusing property between the vertical direction and the horizontal direction and has an excellent scratch resistance. In addition, even when the light-diffusing film is released from a mold, and even during storing and handling of the film, damage on the surface of the film can be prevented.

A screen according to an embodiment of the present invention can provide a projected image that does not have image defects and is appropriately subjected to a light diffusion.

Additional features and advantages are described herein, and will be apparent from, the following Detailed Description and the figures.

DETAILED DESCRIPTION

Embodiments of a light-diffusing film according to the present invention will now be described.

Figure 1:
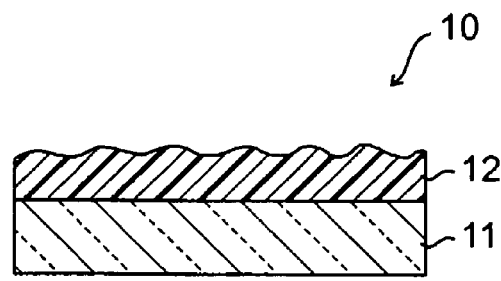
FIG. 1 is a cross sectional view showing a structure of a light-diffusing film according to an embodiment of the present invention.

FIG. 1 is a cross sectional view showing a structure of a light-diffusing film according to an embodiment of the present invention.

As shown in FIG. 1, a light-diffusing film 10 includes a translucent support 11 and a translucent resin layer 12 provided on the translucent support 11. Irregularities are formed on the surface of the translucent resin layer 12. The light-diffusing film 10 has anisotropy in the diffusion angle. In addition, the maximal value of the loss tangent (tan δ) determined from a dynamic viscoelasticity of the light-diffusing film 10 lies in a temperature range of 0° C. to 60° C.

Preferable examples of the translucent support 11 includes a sheet and a film composed of polyester such as polyethylene terephthalate or triacetyl cellulose; polyolefin such as polypropylene; polycarbonate; or polyvinyl chloride, but the translucent support 11 is not particularly limited to these. The thickness of the translucent support 11 is preferably 20 to 300 μm. If the thickness of the translucent support 11 is less than 20 μm, the strength is not sufficient. If the thickness of the translucent support 11 exceeds 300 μm, the handling ability during the production is impaired. In order to improve the adhesive property between the translucent support 11 and the translucent resin layer 12, an easy adhesive layer may be provided on the surface of the translucent support 11. Alternatively, a corona discharge treatment or a plasma treatment may be performed on the surface of the translucent support 11.

The translucent resin layer 12 is an optical film in which the surface shape is controlled by irregularities having, for example, a circular, rectangular, or polygonal shape so that the diffusion angle exhibits anisotropy. The irregularities on the surface of the translucent resin layer 12 can be formed by transferring a fine irregular shape formed on a mold onto the surface of an optical material. For example, irregularities may be embossed on a plastic film for thermoforming by press working using such a mold. Alternatively, a radiation curable resin may be applied on the mold, cured, and released from the mold to form a translucent resin layer having desired irregularities.

Although the resin material used is not particularly limited so long as the resin transmits light and has a predetermined dynamic viscoelasticity, it is not preferable that the color or the amount of transmitted light is changed because of coloring or haze of the resin. In view of the ease of production, resins curable with ultraviolet light, an electron beam, or heat are preferable. Among these, resins curable with ultraviolet light are most preferable. Examples of the resin include acrylate-based resins such as urethane acrylates, epoxy acrylates, polyester acrylates, polyol acrylates, polyether acrylates, and melamine acrylates.

The translucent resin layer 12 may include a light stabilizer, an ultraviolet absorber, an antistatic agent, a flame retardant, an antioxidant, and the like according to need.

Although the thickness of the translucent resin layer 12 is not particularly limited, the thickness is preferably 20 to 200 μm. If the thickness of the translucent resin layer 12 is less than 20 μm, defects of the surface shape are easily generated. If the thickness of the translucent resin layer 12 exceeds 200 μm, the light-diffusing film is easily cracked and the handling ability is impaired.

Examples of the curing energy source for forming the translucent resin layer 12 include an electron beam, ultraviolet light, visible light, and gamma rays. Ultraviolet light is preferable in view of the production equipment. Furthermore, the ultraviolet light source is not particularly limited, and a high-pressure mercury lamp, a metal halide lamp, or the like is appropriately used. The quantity of integrated irradiation can be appropriately selected so that the resin is satisfactorily cured, the resin is satisfactory adhered to the translucent support 11, and in addition, the resin and the translucent support 11 do not turn yellow. The atmosphere during irradiation can be appropriately selected according to the curing state of the resin. The irradiation can be performed in air or an inert atmosphere such as nitrogen or argon.

The loss tangent (tan δ) is determined from a dynamic viscoelasticity of a light-diffusing film. The dynamic viscoelasticity is determined by measuring a viscoelasticity in a tensile mode under a constant strain and a constant frequency while the temperature is continuously increased. The relationship between the temperature and the loss tangent (tan δ) is obtained as the measurement result. A temperature at which the loss tangent (tan δ) has the maximal value serves as an indicator relating to the curing of a material.

When the translucent support 11 has a viscoelasticity, the resultant value includes both the maximal value of the loss tangent (tan δ) derived from the translucent support 11 and the maximal value of the loss tangent (tan δ) derived from the translucent resin layer 12. In this case, first, the viscoelasticity of only the translucent support 11 is measured to determine the maximal value of the loss tangent (tan δ) derived from the translucent support 11. Subsequently, the maximal value of the loss tangent (tan δ) derived from the translucent support 11 is eliminated from the maximal value of the loss tangent (tan δ) measured with the light-diffusing film 10. Thus, the maximal value of the loss tangent (tan δ) derived from the translucent resin layer 12 can be determined.

Since the light-diffusing film 10 is used as an optical element, it is desirable that the light-diffusing film 10 efficiently utilizes light from a light source and has a high transmittance. The total light transmittance is preferably 80% or more.

According to the above-described structure, the light-diffusing film 10 has anisotropy in the light-diffusing property between the vertical direction and the horizontal direction and has an excellent scratch resistance. In addition, even when the light-diffusing film 10 is released from a mold, and even during storing and handling of the light-diffusing film 10, damage on the surface of the light-diffusing film 10 can be prevented.

A method for making a light-diffusing film according to an embodiment of the present invention will now be described.

In a method for making a light-diffusing film according to an embodiment of the present invention, a mold for duplicating a translucent resin layer is prepared. The mold includes a finely carved surface having a predetermined irregular shape thereon. The irregular shape on the surface of the mold is transferred on a translucent resin layer 12 with the mold for duplicating a translucent resin layer. Thus, the translucent resin layer 12 having irregularities thereon is formed on a translucent support 11 to form a light-diffusing film 10.

The present invention can be applied to any method so long as the translucent resin layer is produced from the finely carved surface of the mold.

For example, the irregular shape may be embossed on a plastic film for thermoforming by press working using this mold to form a translucent resin layer.

Alternatively, a UV curable resin may be applied on the mold, cured, and released from the mold to form a desired translucent resin layer.

Steps of making the light-diffusing film 10 shown in FIG. 1 will now be described. In this example, a UV curable resin is used as a material for an optical film constituting a translucent resin layer.

(S11) A mold for duplicating a translucent resin layer is prepared. The mold includes a finely carved surface having a predetermined irregular shape thereon. A translucent resin material is poured on the finely carved surface of the mold. A sealing agent is applied on the four sides of the mold so that the translucent resin material does not leak.

(S12) A film-shaped translucent support 11 is disposed on the coating film of the translucent resin material on the mold.

(S13) The resultant film is irradiated with ultraviolet light from the side of the translucent support 11 to cure the translucent resin material. Thus, a translucent resin layer 12 is formed.

(S14) The mold is removed from the translucent resin layer 12 to obtain the light-diffusing film 10 including the translucent resin layer 12 and the translucent support 11.

The translucent resin material should be appropriately selected among the translucent resin material described above so that the maximal value of the loss tangent (tan δ) determined from a dynamic viscoelasticity of the resultant light-diffusing film 10 lies in a temperature range of 0° C. to 60° C.

In order to determine the diffusion angle of the light-diffusing film 10, the shape or the size of irregularities of the finely carved surface of the mold for duplicating a translucent resin layer, or the refractive index of the translucent resin layer 12 should be adjusted.

The mold for duplicating a translucent resin layer used in this embodiment may be produced, for example, by sandblasting as described below.

Figure 2A:
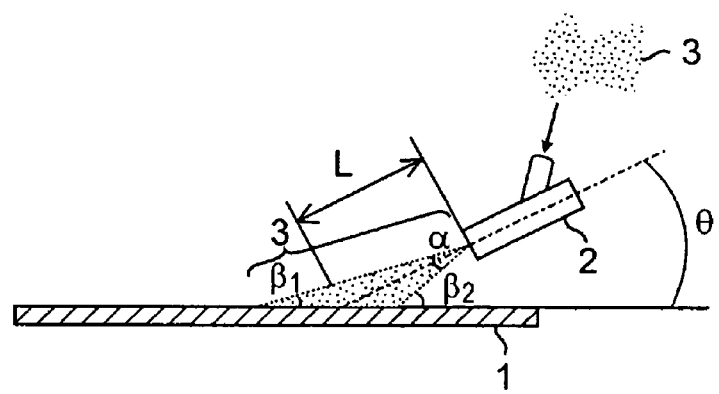
FIGS. 2A and 2B are schematic views showing a step of sandblasting performed on a mold base material in a method for making a mold for duplicating a translucent resin layer used in an embodiment of the present invention.
Figure 2B:
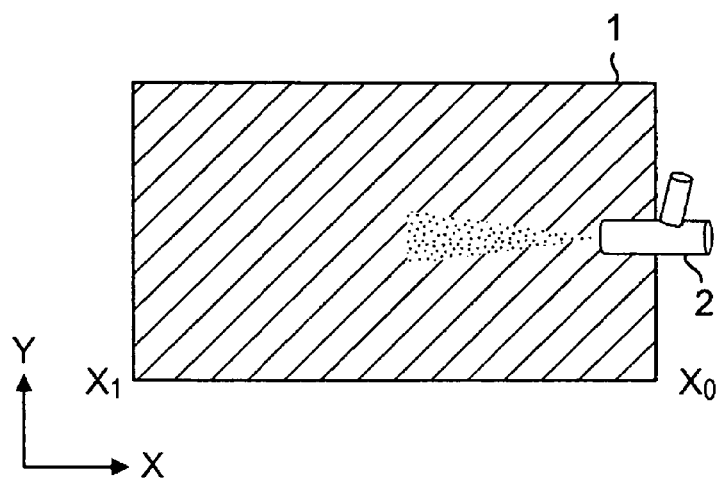

FIGS. 2A and 2b show a production of a mold used for duplicating a light-diffusing film. A surface of a mold base material 1 is processed by sandblasting to produce a mold for duplicating a translucent resin layer. The shape of this mold base material is not limited to a flat plate. Alternatively, the mold base material may have a roll shape or a conveyor shape, which is suitable for the continuous formation of a film.

In the sandblasting process, abrasives 3 are ejected from a blast gun 2 of a sandblasting machine (not shown) with compressed air so as to be sprayed on the surface of the mold base material 1. The abrasives 3 collide with the surface of the mold base material 1, thus forming irregularities on the surface of the mold base material 1.

A polygonal ceramic having a particle diameter of 5 to 50 μm is used for the abrasives 3, but the abrasives 3 are not limited to this. Spherical particles or angulate particles, e.g., polygonal particles having an average diameter of 1 to 1,000 μm and being composed of a resin, glass, a metal, a ceramic, or the like are preferable. Examples of the particles include glass beads, zirconia particles, steel grids, alumina particles, and silica particles.

The mold base material 1 is a sheet composed of a material suited for the sandblasting process. This material is preferably a resin or a metal such as aluminum, copper, or steel. Aluminum is particularly preferable. In a batch production, the mold base material 1 should have a size so that a single mold base material 1 corresponds to the size of a light-diffusing film used in a screen. In a continuous production, the mold base material 1 should have a size that can correspond to the width of the light-diffusing film.

All angles of spraying (angles of depression) of the abrasives 3 are preferably less than 90 degrees to the principal surface of the mold base material 1. In an embodiment of the present invention, the abrasives 3 are sprayed with an angle of 10 degrees. Consequently, pitches of grooves in the spraying direction and the direction orthogonal to the spraying direction can be changed. The reason for this is as follows: Since each of the abrasives 3 collides with the mold base material 1 at an angle, the deformation shapes formed by the collision are different between the horizontal direction (the X-axis direction) and the vertical direction (the Y-axis direction). The parameters of the surface roughness such as the pitch can be adjusted by changing the conditions for sandblasting. The use of abrasives having a large particle diameter can achieve a roughness with a large pitch in both the X-axis direction and the Y-axis direction. The use of abrasives having a larger density can achieve a shape with a deep groove.

The use of a mold for duplicating a translucent resin layer produced under the above spraying conditions can provide a translucent resin layer 12 having different diffusion angles between the horizontal direction and the vertical direction or having anisotropy in the diffusing property between the horizontal direction and the vertical direction. For example, under the spraying conditions of the abrasives 3 shown in FIGS. 2A and 2B, the diffusion angle of reflected light or transmitted light is small in the X direction and is large in the Y direction.

Additionally, when the blast gun 2 is positioned closer to the mold base material 1, in other words, when an angle θ in FIG. 2A becomes smaller, the horizontal to vertical ratio of the diffusion angle of the light-diffusing film, which will be described below, can be increased and the effect of anisotropy in the diffusing property can also be improved.

The abrasives 3 are ejected from the blast gun 2 to the mold base material 1 at the angle θ, which is the center, with an angle tolerance α. In other words, the abrasives 3 are incident on the mold base material 1 at an angle range of $\beta_1$ to $\beta_2$ and collide with the mold base material 1. The angle tolerance α is generally about 10 degrees.

In order to process a smaller area of the mold base material 1, the angle tolerance α should be decreased or a distance L between the blast gun 2 and the mold base material 1 should be decreased. In order to process a larger area, the sandblasting should be performed while the blast gun 2 or the mold base material 1 is moved smoothly. In an embodiment of the present invention, the blast gun 2 is preferably scanned above the mold base material 1 in the horizontal and vertical directions. Thus, the sandblasting may be performed on the entire principal surface of the mold base material 1.

Figure 3:
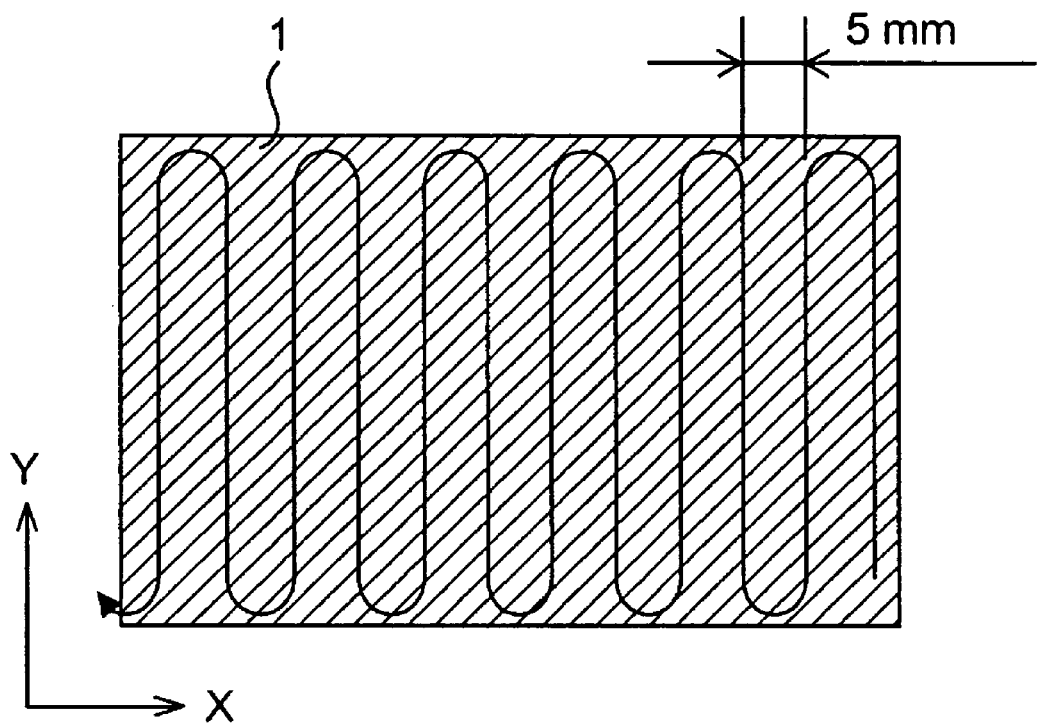
FIG. 3 is a schematic view showing a state of scanning of a blast gun in a method for making a mold for duplicating a translucent resin layer used in an embodiment of the present invention.

FIG. 3 shows an example of scanning of the blast gun 2. The blast gun 2 is moved in one direction of the Y axis above the mold base material 1 at a constant speed while the abrasives 3 are ejected from the blast gun 2. When the collision area of the abrasives 3 reaches the vicinity of the edge of the mold base material 1, the blast gun 2 is moved in the X-axis direction with a certain pitch. The blast gun 2 is then moved in the opposite direction of the Y-axis at the constant speed. Subsequently, each time the collision area of the abrasives 3 reaches the vicinity of the edge of the mold base material 1, the blast gun 2 is moved in the X-axis direction with the certain pitch and the movement in the Y-axis direction is then reversed to perform the sandblasting continuously. Thus, desired irregularities are formed on the entire surface of the mold base material 1.

The moving pitch in the X-axis direction is preferably adjusted so that the adjacent collision areas of the abrasives 3 overlap to a certain degree and the surface of the mold base material 1 has a uniform irregular shape as a whole. In addition, a mask may be disposed at a collision area of the abrasives 3 so that the abrasives 3 collide on only the central area of the collision area of the mold base material 1.

With respect to the scanning method, the mold base material 1 may be fixed and the blast gun 2 may be moved. Alternatively, a stage provided with the mold base material 1 may be moved in the X-axis direction and the blast gun 2 may be moved in the Y-axis direction.

By the above-described sandblasting process, a finely carved surface having an irregular shape is formed on the surface of the mold base material 1. This irregular shape becomes an original mold of a surface shape of the translucent resin layer 12, which is a final product. The translucent resin layer 12 can be formed using this finely carved surface.

The present invention can be applied to any method for producing a translucent resin layer 12 from the above finely carved surface. For example, an electroformed mold on which a finely carved surface is transferred may be produced using a substrate having the finely carved surface and the translucent resin layer 12 may then be directly or indirectly formed with the electroformed mold.

In the above embodiment, sandblasting is used as the production process of the mold for duplicating a translucent resin layer. However, the method is not limited to this so long as fine irregularities are formed on the surface of the mold. Examples of the method include a method of forming a speckle pattern on a photosensitive resin to form a mold, the speckle pattern being formed by irradiating a coherent beam of light on a rough surface; a method of exposing such a pattern on a photosensitive resin using a mask; and a method of directly cutting the surface of a mold base material such as a metal or a resin by machining to form fine irregularities.

Structures of a screen according to embodiments of the present invention will now be described.

Figure 4:
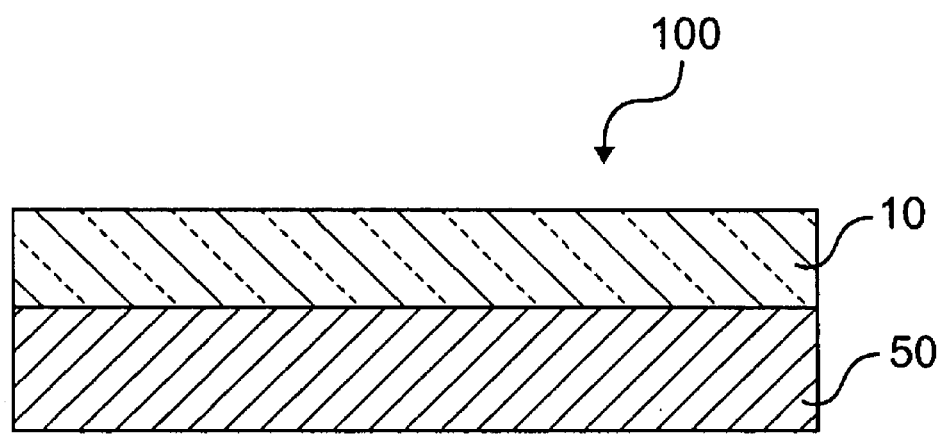
FIG. 4 is a cross-sectional view showing a structure of a screen according to a first embodiment of the present invention.

FIG. 4 is a cross-sectional view showing a structure of a screen according to a first embodiment of the present invention.

A screen 100 is a reflective screen including a reflective sheet 50 and a light-diffusing film 10. The light-diffusing film 10 may be formed directly on the reflective sheet 50 or may be bonded with the reflective sheet 50.

The reflective sheet 50 has a reflection property to a plurality of light components each having a specific wavelength range, the light components corresponding to projector light, i.e., image light, and an absorption property to light components each having a visible wavelength range except for the plurality of specific wavelength ranges. The specific wavelength ranges preferably include wavelength ranges of light components of each of RGB three primary colors, which are used as the image light in a light source of a projector.

Figure 5:
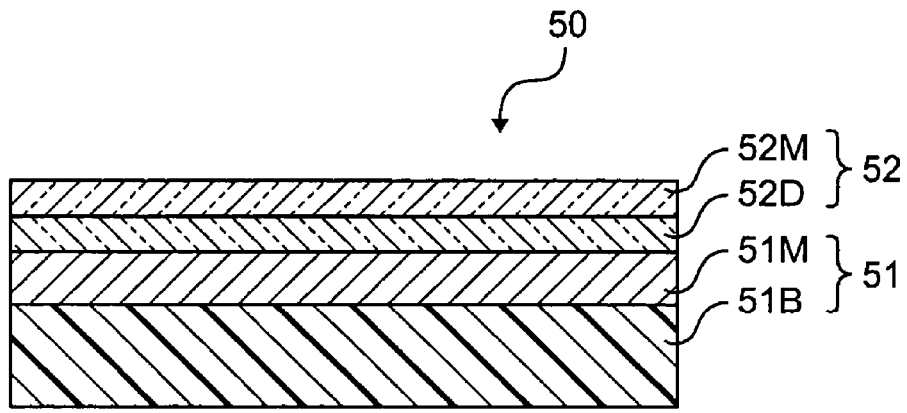
FIG. 5 is a cross-sectional view showing a structure of an optical film of a reflective sheet.

FIG. 5 shows an example of the structure of a reflective sheet 50 including an optical multilayer film 52 and a reflective layer 51. The optical multilayer film 52 includes a dielectric film 52D and a light-absorbing thin-film 52M having a transmissivity.

The reflective layer 51 includes a substrate 51B and a metal film 51M provided on the substrate 51B. This reflective layer 51 reflects light transmitted through the optical multilayer film 52.

The substrate 51B forms a support of the reflective sheet 50. The substrate 51B is composed of a flexible polymer such as polycarbonate (PC), polyethylene terephthalate (PET), polyethylene naphthalate (PEN), polyethersulfone (PES), or a polyolefin (PO).

The metal film 51M is composed of a metal that reflects visible light with high reflectivity. For example, the metal film 51M is composed of Al, Au, or Ag, and preferably has a thickness of 50 nm or more. The metal film 51M may be formed on the substrate 51B by any method such as vapor deposition, plating, or applying.

Alternatively, the reflective layer 51 may be a metal substrate composed of the same material as that of the metal film 51M instead of the reflective layer 51 shown in FIG. 5, which includes the substrate 51B and the metal film 51M provided thereon.

The optical multilayer film 52 includes the dielectric film 52D and the light-absorbing thin-film 52M having a transmissivity. The optical multilayer film 52 is composed of at least two layers and has a selective reflection property. In this case, a plurality of dielectric films 52D and a plurality of light-absorbing thin-films 52M having a transmissivity may be alternately laminated. Alternatively, a plurality of kinds of dielectric film 52D may be sequentially laminated.

The dielectric film 52D is composed of a material that is transparent at least in the visible wavelength region. For example, the dielectric film 52D is composed of $Nb_2O_5$, $TiO_2$, $Ta_2O_5$, $Al_2O_3$, or $SiO_2$. The larger the refractive index of the dielectric film 52D, the larger the half width of the reflection peak in the wavelength range of each light component of the three primary colors. Conversely, the smaller the refractive index of the dielectric film 52D, the smaller the half width. In view of this tendency, the dielectric material should be appropriately selected according to the desired selective reflection property.

The light-absorbing thin-film 52M having a transmissivity is composed of a material having a refractive index of 1 or more and an absorption coefficient of 0.5 or more. The light-absorbing thin-film 52M preferably has a thickness of 5 to 20 nm. Examples of such a material include Nb, Nb alloys, C, Cr, Fe, Ge, Ni, Pd, Pt, Rh, Ti, TiN, $TiN_xW_y$, Mn, Ru, and PbTe. Each film of the optical multilayer film 52 can be formed by a dry process such as sputtering.

Each film thickness of the optical multilayer film 52 is designed as follows: For example, the optical multilayer film 52 has a high reflection property with a reflectivity of at least 50% to the light components having wavelength ranges of the three primary colors, the light components having wavelength ranges of each color of red, green, and blue. On the other hand, for example, the optical multilayer film 52 has a high absorption property with an absorptivity of at least 80% to light components having wavelength ranges except for the wavelength ranges of the light components of the three primary colors. The thickness of each film of the optical multilayer film 52 is preferably designed so that an optical thickness nd of each film and a wavelength λ of incident light satisfy the following equation (1):

$$nd = \lambda(\alpha \pm \frac{1}{4}) \quad (1)$$

wherein d represents a thickness of each film, n represents a refractive index of the film, λ represents a wavelength of light incident on the optical multilayer film, and a represents a natural number.

For example, a reflective sheet 50 includes a metal film 51M composed of Al (thickness: 50 nm) and an optical multilayer film 52 having a three-layer structure composed of $Nb_2O_5/Nb/Nb_2O_5$ (thickness of each film: 560 nm/19 nm/550 nm (adjacent to the Al film)). In this case, the reflective sheet 50 has a high reflectivity of at least 50% to the light components having wavelength ranges of the three primary colors and has a high absorptivity of at least 80% to light components (stray light) each having a wavelength range except for the wavelength ranges of the light components of the three primary colors for projector light (the light from a light source of a projector using a laser oscillator).

Figure 6:
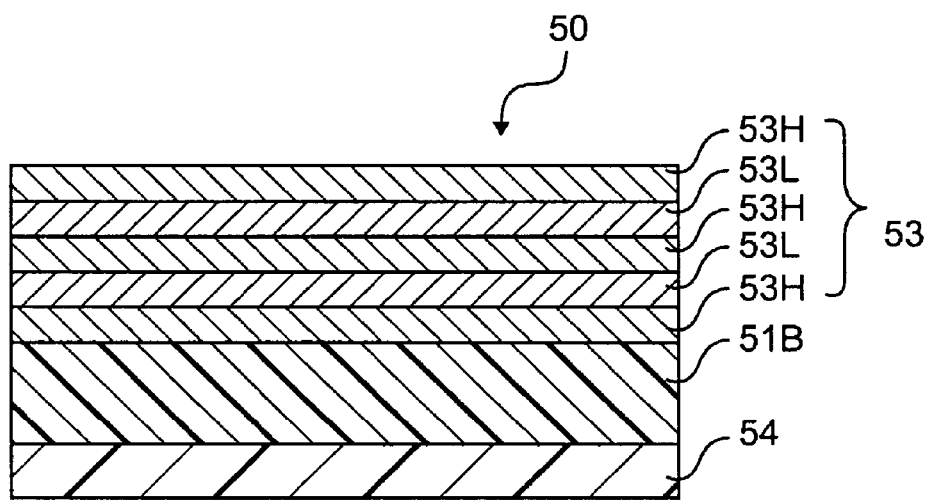
FIG. 6 is a cross-sectional view showing a structure of another optical film of a reflective sheet.

FIG. 6 shows another example of the structure of a reflective sheet 50. The reflective sheet 50 includes a substrate 51B, an optical multilayer film 53 provided on the substrate 51B, and a light-absorbing layer 54 provided on the reverse face of the substrate 51B. The optical multilayer film 53 has a reflection property to light components having wavelength ranges of each of the RGB three primary colors and a transmissive property to light components having wavelength ranges except for the above wavelength ranges of each of the RGB three primary colors among the wavelength range of the projector light. The substrate 51B may be the same substrate as that in FIG. 5.

The optical multilayer film 53 has a selective reflection property. In the optical multilayer film 53, high refractive index films 53H and low refractive index films 53L are alternately laminated. The low refractive index films 53L have a refractive index lower than that of the high refractive index films 53H.

The high refractive index films 53H and the low refractive index films 53L can be formed by either a dry process such as sputtering or a wet process such as spin coating or dip coating.

When the high refractive index films 53H are formed by a dry process, various materials having a refractive index of about 2.0 to about 2.6 can be used for the high refractive index films 53H. When the low refractive index films 53L are formed by a dry process, various materials having a refractive index of about 1.3 to about 1.5 can be used for the low refractive index films 53L. For example, the high refractive index films 53H may be composed of $TiO_2$, $Nb_2O_5$, or $Ta_2O_5$, and the low refractive index films 53L may be composed of $SiO_2$ or $MgF_2$.

When the optical multilayer film 53 is formed by a dry process, the thickness of each film of the optical multilayer film 53 is preferably designed by a simulation based on a matrix method so that the optical thin-film has a high reflection property to light components having specific wavelength ranges and has a high transmissive property to light components having at least a visible wavelength range except for the above wavelength ranges. Herein, the simulation based on a matrix method is a method disclosed in Japanese Unexamined Patent Application Publication No. 2003-270725. In the method, a simulation is performed using an equation based on the following principle to design the film thickness of an optical film having desired characteristics. The principle is as follows: When light is incident at an angle $\theta_0$ on a multilayer optical thin-film system composed of a plurality of different materials in which a multiple reflection is generated at the boundary of each layer, the phase is aligned depending on the type and the wavelength of a light source used and the optical film thickness (i.e., the product of the refractive index and the geometrical film thickness) of each layer. As a result, the reflected beam of light may exhibit coherence and interfere with each other.

In the present invention, wavelength ranges of light components of each of RGB three primary colors, which are used as image light in a light source of a projector, should be selected as the specific wavelength range. The film thickness should be designed by a simulation based on the matrix method so that only light components having these wavelength ranges are reflected and light components having wavelength ranges except for the above wavelength ranges are transmitted. High refractive index films 53H and low refractive index films 53L having thicknesses satisfying the above condition overlap with each other, thereby reliably achieving the optical multilayer film 53 that satisfactorily functions as a filter for wavelength ranges of the three primary colors.

The number of layers of the optical film constituting the optical multilayer film 53 formed by a dry process is not particularly limited and may be a desired number of layers. However, the optical multilayer film 53 is preferably composed of an odd number of layers in which the outermost layers at the light-incident side and the opposite side are high refractive index films 53H.

When the optical multilayer film 53 is formed by a wet process, high refractive index films 53H are formed by applying a solvent-based coating material for a high refractive index film and curing the coating material, and low refractive index films 53L are formed by applying a solvent-based coating material for a low refractive index film and curing the coating material. The solvent-based coating material for a low refractive index film provides an optical film having a refractive index lower than that of the high refractive index films 53H. The optical multilayer film 53 is preferably composed of an odd number of layers in which the high refractive index films 53H and the low refractive index films 53L are alternately laminated. Each of the optical film is preferably formed by applying a coating material containing a resin that is subjected to a curing reaction by absorbing energy provided by heating, ultraviolet irradiation, or the like. For example, the high refractive index films 53H are preferably composed of a thermosetting resin of Opster from JSR Corporation (JN7102, refractive index: 1.68), and the low refractive index films 53L are preferably composed of a thermosetting resin of Opster from JSR Corporation (JN7215, refractive index: 1.41). Such an optical multilayer film 53 has flexibility.

The material of the high refractive index films 53H is not limited to the above thermosetting resin. The material may be a solvent-based coating material that provides a refractive index of about 1.6 to about 2.1. For example, a material for an optical film having a high refractive index described in the above light-diffusing film may be used. Also, the material of the low refractive index films 53L is not limited to the above thermosetting resin. The material may be a solvent-based coating material that provides a refractive index of about 1.3 to about 1.59. For example, a material for an optical film having a low refractive index described in the above light-diffusing film may be used. The larger the difference between the refractive index of high refractive index film 53H and the refractive index of low refractive index film 53L, the smaller the number of the laminated layers.

When the optical multilayer film 53 is formed by a wet process, each film thickness of the optical multilayer film 53 is designed as follows: For example, the optical multilayer film 53 has a high reflection property with a reflectivity of at least 50% to light components having wavelength ranges of the three primary colors, the light components having wavelength ranges of each color of red, green, and blue. On the other hand, for example, the optical multilayer film 53 has a high transmissive property with a transmittance of at least 80% to light components having wavelength ranges except for the wavelength ranges of light components of the three primary colors. The thickness of each film of the optical multilayer film 53 is preferably designed so as to satisfy the above equation (1).

For example, each high refractive index film 53H (refractive index: 1.68) has a thickness of 1,023 nm and each low refractive index film 53L (refractive index: 1.41) has a thickness of 780 nm. Nine high refractive index films 53H and nine low refractive index films 53L are alternately laminated and a high refractive index film 53H is further laminated on the laminate to form an optical multilayer film 53 having a 19-layer structure. In this case, a multilayer film has a high reflectivity of at least 80% to the light components having wavelength ranges of the three primary colors and has a high transmissive property with a reflectivity of 20% or less to light components (stray light) each having a wavelength range except for the wavelength ranges of the light components of the three primary colors for projector light (the light from a light source of a projector using a laser oscillator).

The light-absorbing layer 54 is a black coated film formed by applying a black coating material on the reverse face of the substrate 51B, or a black film applied on the reverse face of the substrate 51B. The light-absorbing layer 54 has a function of light absorption. According to this structure, the light-absorbing layer 54 absorbs light transmitted through the optical multilayer film 53 to prevent the reflection of transmitted light. As a result, in the reflective sheet 50, only the light components having wavelength ranges of the three primary colors can be more reliably obtained as reflected light. Alternatively, the substrate 51B may contain a black coating material or the like so that the color of the substrate 51B is black. Thus, the substrate 51B itself may function as a light-absorbing layer.

In both the above-described reflective sheets 50, light components having specific wavelength ranges (wavelength ranges of the three primary colors) can be reflected with high reflectivity and light components (external light) having wavelength ranges except for the specific wavelength ranges can be absorbed, corresponding to light projected from a light source of a projector.

Since the screen 100 includes a reflective sheet 50, the screen 100 reflects light components having wavelength ranges of the three primary colors. Therefore, a viewer views a reflected image of an image projected on this screen. In other words, the viewer views only reflected light of the image projected on the reflective screen. However, when the reflected light on the screen is composed of only specular components, for example, it is difficult to view satisfactory images and the field of view is limited. This is disadvantageous to a viewer and the natural images are difficult to be viewed.

Consequently, the screen 100 further includes a light-diffusing film 10, thereby scattered reflected light from the screen 100 can be viewed. Specifically, according to the structure including the light-diffusing film 10 provided on the reflective sheet 50, in the incident light passed through the light-diffusing film 10, light components having specific wavelength ranges are selectively reflected on the reflective sheet 50. In this case, the reflected light is diffused when passed through the light-diffusing film 10, thereby obtaining scattered reflected light other than the specular components.

Consequently, the light reflected from the reflective screen 100 includes the specular components and the scattered reflected light. The viewer can observe the scattered reflected light in addition to the specular components, thus significantly improving the characteristics of the field of view. As a result, the viewer can view natural images.

In addition, the light-diffusing film 10 according to an embodiment of the present invention is used as the light-diffusing film in the screen 100. Therefore, the damage of the surface of the light-diffusing film can be prevented when the light-diffusing film is released from a mold and during storing and handling of the light-diffusing film. Accordingly, normal reflected images can be viewed. Furthermore, when image light is projected and the screen is viewed from the vicinity of the front, an image having a uniform and high luminance can be viewed at a specific position. Thus, it can be confirmed that the reflected image light is controlled so as to be directed in a specific field of view.

The reflective sheet 50 in the above embodiment includes a wavelength-selective reflective layer. However, the reflective layer is not limited to this so long as the reflective layer can reflect the projected image light. For example, the reflective layer may be composed of a material having a high reflectivity over a wide wavelength range of visible light, for example, aluminum or silver.

Figure 7:
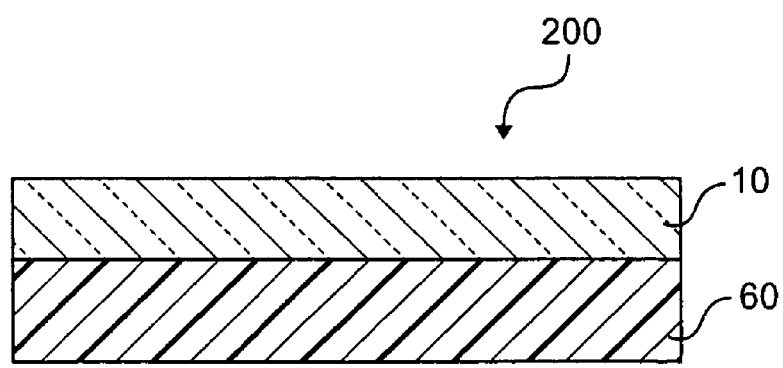
FIG. 7 is a cross-sectional view showing a structure of a screen according to a second embodiment of the present invention.

FIG. 7 is a cross-sectional view showing a structure of a screen according to a second embodiment of the present invention.

As shown in FIG. 7, a screen 200 is a transmissive screen including a support 60 and a light-diffusing film 10 provided on the support 60.

The support 60 functions as a support of the screen 200 and is composed of a polymer such as polyethylene terephthalate (PET), polyethylene naphthalate (PEN), polyethersulfone (PES), or a polyolefin (PO).

In the screen 200, incident light is received on a surface of the support 60, the surface opposite to the surface having the light-diffusing film 10 thereon. The incident light is transmitted through the support 60, scattered on the light-diffusing film 10, and is emitted. The viewer can view natural images by viewing this scattered reflected light.

The light-diffusing film 10 according to an embodiment of the present invention is used as the light-diffusing film in the screen 200. Therefore, the damage of the surface of the light-diffusing film can be prevented when the light-diffusing film is released from a mold and during storing and handling of the light-diffusing film. Accordingly, normal transmitted images can be viewed.

The screen 200 according to the second embodiment of the present invention is prepared by, for example, applying the light-diffusing film 10 on a surface of the support 60 composed of a PET film.

In a modification of the screen 200, a translucent resin layer 12 may be formed on the support 60.

Furthermore, in both the screens 100 and 200, the surface shape of the light-diffusing film 10 is preferably controlled with respect to each screen position, thereby adjusting the diffusing property. Thus, the luminance distribution of the entire screen viewed from a viewer is controlled to be uniform. In order to achieve this, for example, the shift of axis of a luminance peak is preferably in the direction of the central part of the screen. That is, from a viewpoint of the diffusing property of the entire screen, as the diffusing property in all the peripheral parts (i.e., the upper, the lower, the left, and the right peripheries) of the screen, the peak of the luminance of the transmitted light is tilted in the direction of the central part of the screen, and the tilt is continuously changed to be increased as the position is shifted from the central part to the peripheral part of the screen.

The scope of application of the light-diffusing film according to an embodiment of the present invention is not limited to projection display devices described above. The light-diffusing film according to an embodiment of the present invention can be applied to various fields such as display devices in which the viewing angle is controlled, for example, a backlight for a liquid crystal display, or lighting systems.

EXAMPLES

Examples of the present invention will now be described. The following examples are exemplifications and the present invention is not limited to these examples.

Example 1

A light-diffusing sheet was prepared under the following conditions.

(1) Mold for duplicating a translucent resin layer

A mold for duplicating a translucent resin layer was prepared by sandblasting under the following conditions.

(a) Mold base material: aluminum plate
(b) Conditions for sandblasting

Sandblasting machine (from Fuji Manufacturing Co., Ltd.)

Abrasives: alumina (No. #180, average particle diameter: 76 μm)

Distance between a blast gun and the mold base material: 50 mm

Angle formed by the blast gun and the mold base material: 9 degrees

Pressure of compressed air: 0.6 MPa

State of spraying the abrasives onto the surface of the mold base material: the state shown in FIGS. 2A and 2B Conditions for scanning the blast gun: The blast gun was scanned in the X direction and the Y direction with a pitch of 5 mm in the state shown in FIG. 3.

The resultant surface of the mold had different irregular shapes between the vertical direction and the horizontal direction. A value of Sm (average distance of irregularities) was measured as a parameter of the surface shape with an ET4000A stylus type micro figure measuring instrument (from Kosaka Laboratory Ltd.). The average distance of irregularities Sm in the X-axis direction was S=0.13, and that in the Y-axis direction was S=0.07.

(2) Translucent support: a polyethylene terephthalate (PET) film (A4300 from Nippon Magphane Co., Ltd., thickness: 100 μm)

(3) Resin material A of the translucent resin layer: a UV curable acrylic resin (Steps of preparing a light-diffusing film)

(S21) The resin material A was applied on the finely carved surface of the mold for duplicating a translucent resin layer.

(S22) The coated film composed of the resin material A on the mold was covered with the PET film so as not to include air bubbles. In this step, the resultant film was pressurized while the pressure was controlled with a rubber roller so that the thickness of the coated resin film was 50 μm.

(S23) The resultant film was irradiated with ultraviolet light from the side of the PET film with a quantity of integrated irradiation of 1,000 mJ/cm$^2$, which was sufficient to polymerize and cure the resin. Thus, the resin material A was cured.

(S24) The mold was removed from the translucent resin layer at room temperature to prepare a light-diffusing film including the translucent resin layer and the PET film.

Examples 2 to 5

Light-diffusing films were prepared as in Example 1 except that UV curable acrylic resins (resin materials B, C, D, and E) each having a different glass transition temperature were used as the resin material.

Example 6

A light-diffusing film was prepared as in Example 2 except that, in the preparation of a mold for duplicating a translucent resin layer, the angle formed by the blast gun and the mold base material was changed during sandblasting.

Comparative Examples 1 to 3

Light-diffusing films were prepared as in Example 1 except that UV curable acrylic resins (resin materials F, G, and H) each having a different glass transition temperature were used as the resin material.

Comparative Example 4

A translucent resin layer was formed under the following conditions. The same translucent support as that in Example 1 was used.

(1) Resin material I: A resin material I was prepared by mixing the following compositions.

Styrene beads (Styrene beads SBX6 from Sekisui Plastics Co., Ltd., particle diameter: 6 μm)7 weight percent UV curable acrylic resin (Resin material B used in Example 2)93 weight percent (Steps of preparing a light-diffusing film)

(S31) The resin material I was uniformly applied on a translucent support.

(S32) The resultant resin material I and the translucent support were irradiated with ultraviolet light with a quantity of integrated irradiation of 1,500 mJ/cm$^2$ without using a mold to cure the resin material I. Thus, a light-diffusing film including the translucent resin layer (beads layer) and the PET film was prepared.

The light-diffusing films prepared as described above were evaluated as follows.

(i) Maximal Temperature of the Loss Tangent (tan δ)

A sample of 5 mm×50 mm was cut out from a light-diffusing film. The viscoelasticity of the light-diffusing film sample was measured with a DVA220 dynamic viscoelastometer from IT Keisoku Seigyo Co., Ltd. The viscoelasticity was measured in a tensile mode under a constant strain with a frequency of 5 Hz while the temperature was increased from −50° C. to 200° C. at a heating rate of 2° C./min. Thus, a tensile dynamic viscoelasticity was determined. Subsequently, the relationship between the temperature and the loss tangent (tan δ) was calculated from the dynamic viscoelasticity to determine the temperature at which the loss tangent (tan δ) had the maximal value (i.e., maximal temperature of the loss tangent (tan δ)).

Additionally, the viscoelasticity of only the PET film, i.e., the translucent support, was also measured. The measured maximal temperature of the loss tangent (tan δ) was 115° C. This result showed that the maximal temperature of the loss tangent (tan δ) observed at 115° C. in a light-diffusing film was resulted from the translucent support.

(ii) Releasing Property from a Mold in the Formation of a Film

Among the steps of preparing a light-diffusing film, in step S24, the appearance of a light-diffusing film when released from a mold was visually evaluated.

(iii) Pencil Hardness

As an evaluation of scratch resistance, the pencil hardness of the translucent resin layer side of a light-diffusing film was measured at room temperature in accordance with a method described in Japanese Industrial Standard (JIS) 5600-5-4.

(iv) Load Test

A glass flat plate was disposed on the surface of the translucent resin layer side of a light-diffusing film at 60° C. A load of 1,000 g/cm$^2$ was applied on the glass plate and this state was kept for 72 hours. Subsequently, the temperature was decreased to room temperature and the surface of the light-diffusing film was visually observed. When the trace of weighting was visually seen, the sample was evaluated as NG (unsatisfactory). When the trace of weighting was not visually seen, the sample was evaluated as OK (satisfactory).

(v) Bending Test

A test corresponding to a situation in which a translucent resin layer was bent at an acute angle during handling of a light-diffusing film was performed as follows. The PET film surface (i.e., the surface opposite to another surface having a translucent resin layer thereon) of a light-diffusing film was in contact with an iron rod having a diameter of 1 mm at room temperature. The light-diffusing film was bent 20 times so that an angle formed by the light-diffusing film around the rod was 30 degrees. Subsequently, the surface state of the light-diffusing film was visually observed. When the trace of the bending was visible, the sample was evaluated as NG (unsatisfactory). When the trace of bending was not visible, the sample was evaluated as OK (satisfactory).

Table 1 shows the evaluation results.

According to the results, light-diffusing films according to embodiments of the present invention showed satisfactory results in the releasing property from a mold in the formation of a film, the pencil hardness, the load test, and the bending test, while the anisotropy of diffusion angle was maintained (described below). Since the maximal temperature of the loss tangent (tan δ) determined from the dynamic viscoelasticity lies in the range of the present invention (from 0° C. to 60° C.), the translucent resin layer is in a state having an adequate strength and flexibility. Consequently, the translucent resin layer can simultaneously satisfy the pencil hardness test and the load test on which the strength of the translucent resin layer affects, and the bending test and the releasing property from a mold on which the flexibility affects. When the maximal temperature of the loss tangent (tan δ) was lower than a temperature in the range of the present invention, the translucent resin layer was excessively flexible. As a result, the translucent resin layer was easily adhered to the mold. In addition, such an excessively low maximal temperature of the loss tangent (tan δ) caused a deformation in the load test and a decrease in the pencil hardness. On the other hand, when the maximal temperature of the loss tangent (tan δ) was higher than a temperature in the range of the present invention, the translucent resin layer was hard and brittle. As a result, the film was cracked during releasing from the mold and during the bending test. The pencil hardness was also decreased because of the brittleness.

TABLE 1

|  | tan δ Maximal temperature (° C.) | Releasing property from mold in formation of film | Pencil hardness test | Load test | Bending test |
| --- | --- | --- | --- | --- | --- |
| Example 1 | 5, 115 | Satisfactory | 3H | OK | OK |
| Example 2 | 36, 115 | Satisfactory | 5H | OK | OK |
| Example 3 | 22, 115 | Satisfactory | 4H | OK | OK |
| Example 4 | 56, 115 | Satisfactory | 5H | OK | OK |
| Example 5 | 22, 95, 115 | Satisfactory | 6H | OK | OK |
| Example 6 | 36, 115 | Satisfactory | 5H | OK | OK |
| Comparative Example 1 | −5, 115 | Adhered to mold | 2B | NG | OK |
| Comparative Example 2 | 75, 115 | Film cracking | 2H | OK | NG |
| Comparative Example 3 | 95, 115 | Film cracking | H | NG | NG |
| Comparative Example 4 | 36, 115 | — | 3H | NG | NG |

Examples A to F and Comparative Examples a to d

Subsequently, a reflective layer was formed on the PET film surface (i.e., the surface opposite to another surface having a translucent resin layer thereon) of each light-diffusing film in Examples 1 to 6 and Comparative Examples 1 to 4 by aluminum evaporation. Thus, reflective screens each having a size of 100 inches with a ratio of 4:3 were prepared.

The screens prepared as described above were evaluated as follows.

(1) Diffusion Angle

A diffusion angle was determined from a state of the luminance distribution of reflected light on each screen. Specifically, in the measurement, a liquid crystal projector (VPL-CX5 from SONY Corporation) with an optical output of 2000 ANSI lumen was disposed so as to face a screen, and a white image was projected. The distance between the screen and the projector was 2 m. The position of a projection lens of the projector was set to zero degrees. In order to measure the luminance, a luminance meter (BM-9 from TOPCON Corporation) was scanned on a circular arc with a radius of 2 m, the circular arc having its center on a light-diffusion film of the screen. An angle at which the luminance was half (half width) of the maximum luminance was defined as the diffusion angle. Diffusion angles in the vertical direction and in the horizontal direction of the screen were determined.

(2) Screen Gain and Luminance Distribution on Screen

A liquid crystal projector (VPL-CX5 from SONY Corporation) with an optical output of 2000 ANSI lumen was disposed so as to face a screen, and a white image was projected. The projector was positioned away from a surface having a screen by 2 m in the horizontal direction. A luminance S at the central part of the screen was measured with a luminance meter (BM-9 from TOPCON Corporation). A luminance W when a standard white board was disposed at the same position was also measured. The ratio of the luminance S to the luminance W (S/W) was calculated and was defined as a screen gain. In addition, the in-plane luminance distribution on the screen was visually evaluated.

Table 2 shows the evaluation results.

The results showed that anisotropy of diffusion angle was provided in Examples A to F.

In addition, in Examples A to E, the diffusion angles in the horizontal and vertical directions were appropriately controlled. Consequently, screens having a high screen gain, that was bright, and having a satisfactory in-plane luminance distribution could be produced. Furthermore, in Example F, a screen in which the screen gain was high and the directivity of the reflected light in the horizontal direction was strong could be produced.

TABLE 2

| | Light-diffusing film | Diffusion angle Vertical/Horizontal (°) | Vertical/Horizontal Ratio | Screen gain | Luminance distribution on screen |
|---|---|---|---|---|---|
| Example A | Example 1 | 32/51 | 0.63 | 2.5 | No problem |
| Example B | Example 2 | 32/51 | 0.63 | 2.5 | No problem |
| Example C | Example 3 | 32/51 | 0.63 | 2.5 | No problem |
| Example D | Example 4 | 32/51 | 0.63 | 2.5 | No problem |
| Example E | Example 5 | 32/51 | 0.63 | 2.5 | No problem |
| Example F | Example 6 | 10/62 | 0.16 | 2.5 | Directivity in the horizontal direction (Unevenness of dark part in the vertical direction) |
| Comparative Example a | Comparative Example 1 | — | — | 2.5 | No problem |
| Comparative Example b | Comparative Example 2 | 32/51 | 0.63 | 2.5 | No problem |
| Comparative Example c | Comparative Example 3 | 32/51 | 0.63 | 2.5 | No problem |
| Comparative Example d | Comparative Example 4 | 64/65 | 1 | 1.1 | No problem |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A screen comprising:
a light-diffusing film including,
a translucent support, and
a translucent resin layer having a continuous irregular pattern covering an entire surface thereof and being provided on the translucent support, a surface profile of the irregular pattern being configured such that the single translucent layer both diffuses light and has anisotropy in the diffusion angle; and
a reflective layer provided on a second surface of the light-diffusing film, the second surface being opposite to the first surface,
wherein: a maximal value of a loss tangent (tan δ) determined from a dynamic viscoelasticity of the light-diffusing film is provided in a temperature range from about 0° C. to about 60° C.,
the irregular pattern on the surface of the translucent resin layer is configured so that the diffusion angle includes a first diffusion angle in a horizontal direction parallel to a plane of the translucent resin layer, and includes a second diffusion angle in a vertical direction parallel to the plane of the translucent resin layer and perpendicular to the horizontal direction, and the first diffusion angle is larger than the second diffusion angle,
wherein the irregular pattern includes irregularities having curved surfaces and having a vertical size in the vertical direction and a horizontal size in the horizontal direction, and an average vertical size of all of the irregularities is greater than an average horizontal size of all of the irregularities, and
wherein the irregular pattern is formed such that the density of irregularities is at least substantially uniform over the entire surface thereof.

2. The screen according to claim 1, wherein the irregular pattern on the surface of the translucent resin layer is formed by transferring an irregular pattern of elongated grooves formed into a surface of a mold.

3. The screen according to claim 2, wherein the irregular pattern of elongated grooves on the surface of the mold is formed by sandblasting so that all angles of spraying of abrasives are less than 90 degrees relative to the surface of the mold, and so that the abrasives are sprayed in a horizontal direction of the mold, the horizontal direction of the mold corresponding to the horizontal direction of the translucent resin layer.

4. The screen according to claim 3, wherein the angles of spraying of abrasives are about 10 degrees or less relative to the surface of the mold.

5. The screen according to claim 1, wherein the pencil hardness of the translucent resin layer is more than 3H.

* * * * *